March 28, 1961 W. STELZER 2,976,849
POWER MECHANISM
Filed May 20, 1957 4 Sheets-Sheet 4
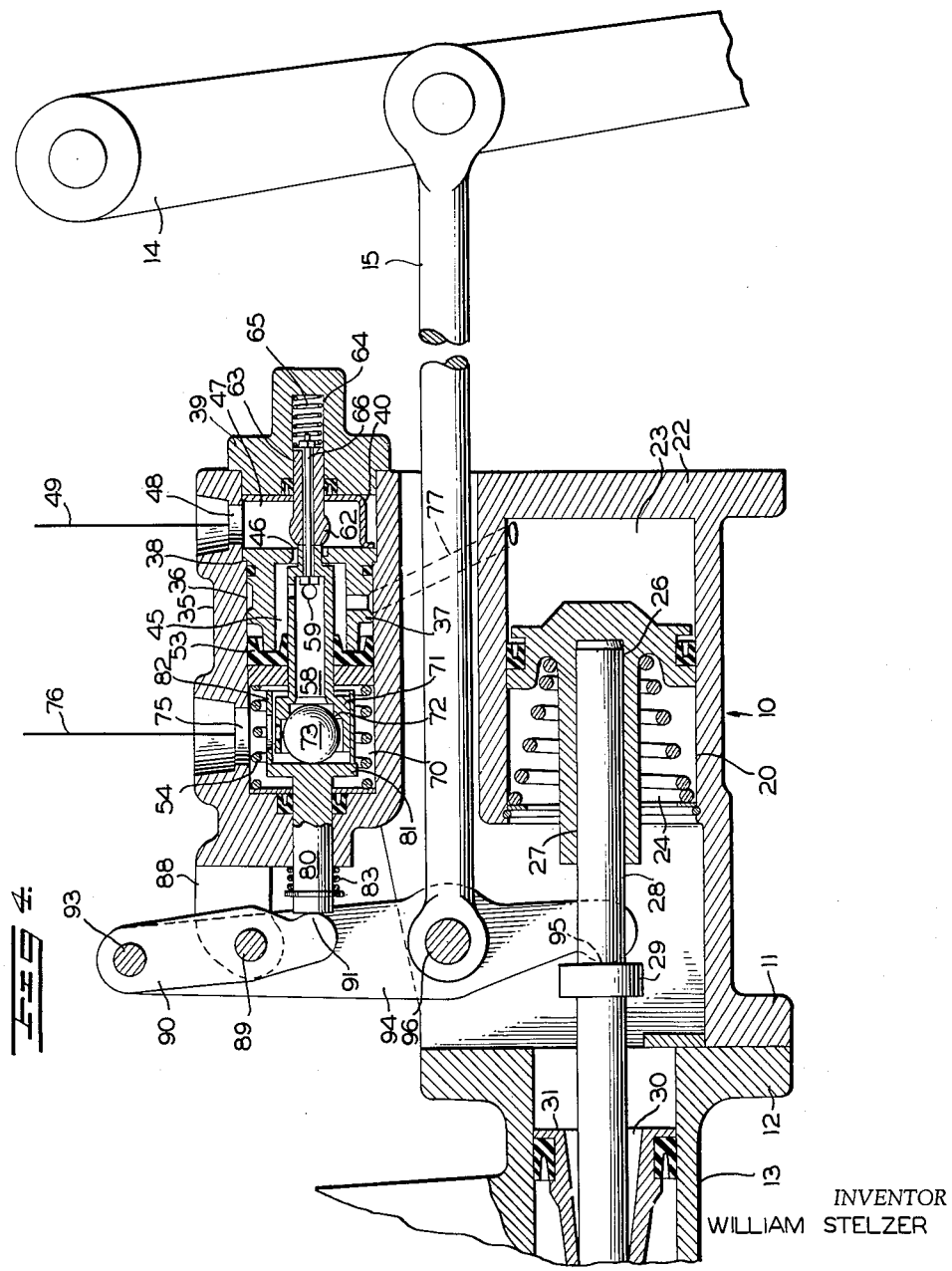
INVENTOR
WILLIAM STELZER
BY *John F. Phillips*
ATTORNEY

United States Patent Office 2,976,849
Patented Mar. 28, 1961

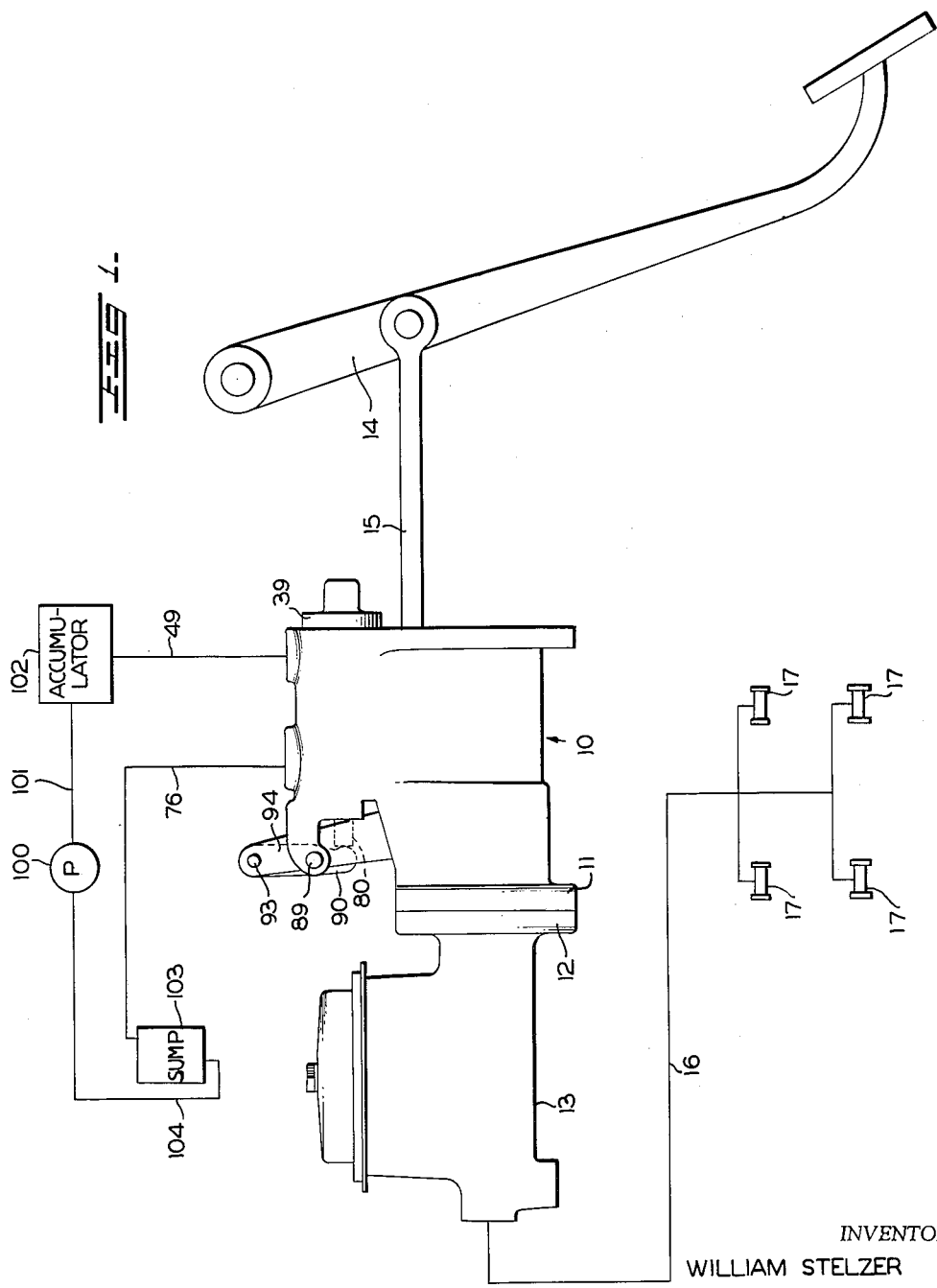

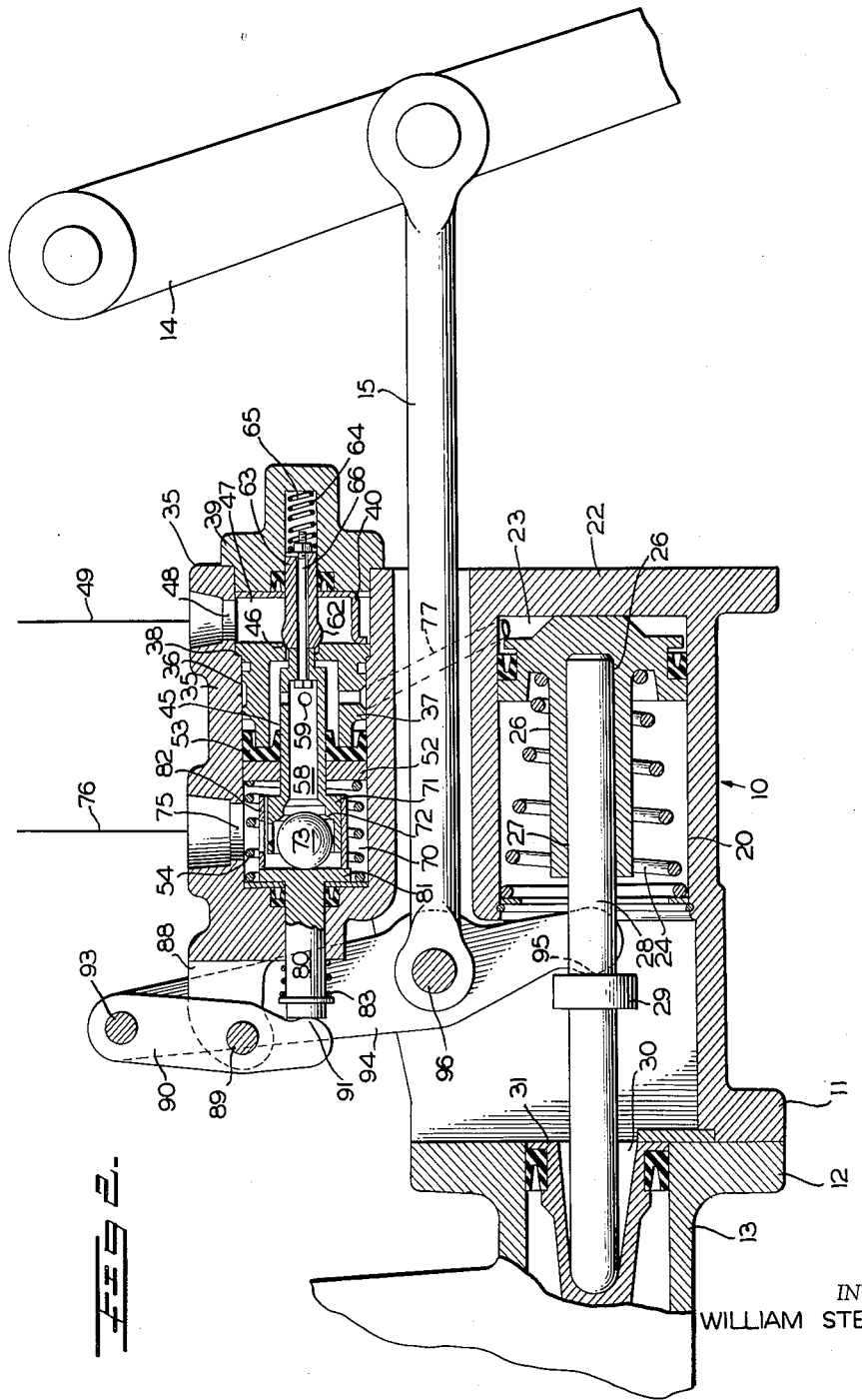

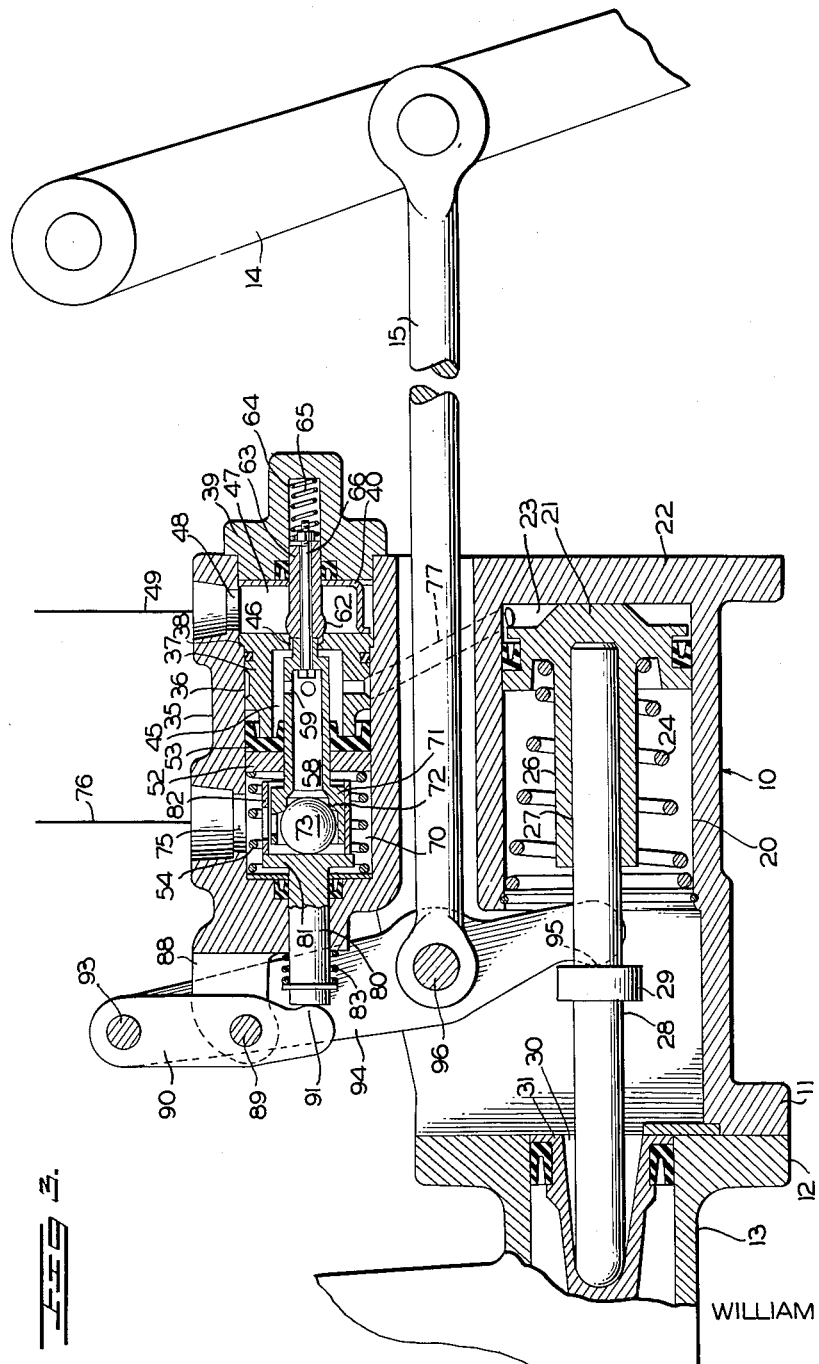

2,976,849
POWER MECHANISM

William Stelzer, Bloomfield Hills, Mich., assignor to Kelsey-Hayes Company, Detroit, Mich., a corporation of Delaware Filed May 20, 1957, Ser. No. 660,305
4 Claims. (Cl. 121—41)

This invention relates to a power mechanism, and more particularly to such a mechanism for use in connection with a vehicle brake system and employing a hydraulic motor in a closed hydraulic system, operable from a source of hydraulic pressure such as an accumulator.

An important object of the invention is to provide a novel arrangement of parts whereby, upon a failure of power for operating the motor, direct pedal forces may be transmitted to the master cylinder piston without encountering resistances due to friction, return springs, etc., thus enabling greater pedal pressures to be employed under such conditions.

A further object is to provide such an apparatus wherein hydraulic motor power is applied axially to the master cylinder piston through the medium of a push rod to which pedal connections are made, and which push rod is movable in a fluid displacing direction freely of the motor piston, thus enabling the operator, in the event of a failure of power in the motor, to operate the pedal and thus effect operation of the master cylinder piston wholly independently of the motor piston.

A further object is to provide such an apparatus wherein the axial length of the mechanism is reduced by offsetting the control valve mechanism for the motor and by providing a novel lever mechanism interconnecting the valve mechanism, the push rod for operating the master cylinder piston, and the push rod connected to the brake pedal.

Other objects and advantages of the invention will become apparent during the course of the following description.

In the drawings I have shown one embodiment of the invention. In this showing:

Figure 1 is a side elevation of the mechanism, elements of the braking system being diagrammatically represented;

Figure 2 is an enlarged fragmentary sectional view through the motor and control valve mechanism, parts being broken away and parts being shown in elevation, the valve mechanism and associated elements being shown in their normal off positions;

Figure 3 is a similar view showing the valve parts in lap positions; and

Figure 4 is a similar view showing the parts in operative positions during a brake application.

Referring to Figure 1, the numeral 10 designates a preferably die-cast body which houses the hydraulic motor and the valve mechanism therefor as described below. This body has a flange 11 at its forward end connected in any suitable manner (not shown) with a flange 12 carried by the rear end of a conventional master cylinder 13. The apparatus is operated in the manner to be described through the medium of a conventional depending brake pedal 14 from which motion is transmitted to the mechanism through a push rod 15. Fluid is displaced from the master cylinder through lines 16 to conventional wheel cylinders 17.

The casting 10 (Figures 2, 3 and 4) has formed therein a motor cylinder 20 in which is operable a piston 21. One end of the casting 10 forms a motor head 22 and between this head and the piston 21 is formed a pressure chamber 23 to which hydraulic pressure fluid is supplied to operate the piston 21. The piston 21 is biased to its normal position by a return spring 24.

The piston 21 is provided with an axial extension 26 having a bore 27 therein in which is slidable the rear end of a push rod 28 carrying a collar 29 for a purpose to be described. The forward end of the rod 28 is mounted in the usual recess 30 of the master cylinder piston 31 movable in the master cylinder in the usual way for displacing fluid to the wheel cylinders. It will become apparent that the piston 21, upon energization of the hydraulic motor, moves the push rod 28 to the left to operate the master cylinder piston 31. The push rod 28, however, is movable in such direction by sliding in the bore 27 independently of the motor piston 21 in the event of a failure of power in the motor.

Also forming part of the body 10 is a preferably integral valve housing 35 having formed therein a bore 36 in which is mounted a stationary cup-shaped member 37 flanged at one end for engagement with a shoulder 38. The member 37 is insertable in the housing 35 through the right end thereof. Such end of the valve housing is closed by a fixed cap 39 bearing against a clip 40 which maintains the member 37 in position.

The left-hand end of the member 37 is formed as an annular flange forming therein a chamber 45 adapted to communicate through a port 46 with a chamber 47 formed between the members 37 and 39. The chamber 47 communicates through a port 48 with a hydraulic pressure line 49 further referred to below.

Within the bore 36 is arranged a bearing washer 52 normally occupying the position shown in Figures 2 and 3. This washer engages against a double-lipped seal 53 normally engaging the adjacent end of the cup-shaped member 37. The washer 53 is biased to its normal position by a spring 54.

A tubular member 58 is slidable through the bearing washer 52 and through the inner lip of the cup 53 and communicates through openings 59 with the chamber 45. A valve 62 is arranged in the chamber 47 and is provided with an axial extension 63 slidable in a bore 64 in the cap 39 and engaged by a spring 65 to bias the valve 62 to the closed position shown in Figures 2 and 3. The valve member 62 is secured to the tubular member 58 by a bolt 66 around which there is a space whereby the interior of the tubular member 58 communicates with the bore 64 to balance pressures at opposite ends of the valve member. The valve element 62 itself is spherical and the diameter of the extension 63 is equal to the diameter of the opening 46 to balance pressures on opposite sides of the valve element.

The tubular member 58 extends into a chamber 70 formed to the left of the bearing washer 52 and has an enlarged head 71 formed with a valve seat 72 therein. This seat is engageable by a ball valve 73 contained within the enlargement 71. The chamber 70 communicates through a port 75 with a fluid return line 76 further described below. As will become apparent, pressure in the line 76 is that of the atmosphere, and since the valve 73 is normally open as in Figure 2, atmospheric pressure will be present in the tubular member 58 and chamber 45, and hence in the motor chamber 23 which communicates with the chamber 45 through a duct 77.

In the closed left-hand end of the valve housing 35 is slidable a stem 80 projecting from the valve housing and provided within the chamber 70 with a head 81 engageable with the ball 73 to move the latter into engagement with its seat 72. From the head 81 projects an extension 82. This extension, as well as the extension 71, is apertured for the free connection of the interior of the tubular member 58 with the port 75, as will be obvious. The stem 80 is biased to the left to its normal position by a spring 83.

The valve body 35 carries integral spaced ears 88 between which extends a pivot pin 89 pivotally supporting a lever 90 the lower end of which contacts at 91 the adjacent end of the stem 80. The upper end of the lever 90 is pivotally connected as at 93 with a pair of parallel levers 94 the lower ends of which comprise a yoke engaging as at 95 with the collar 29. The lever arms 94 are pivotally connected as at 96 with the push rod 15, this rod extending between the lever arms 94, as will be obvious.

Pressure for operating the hydraulic motor is provided by a pump 100 having an outlet pressure line 101 connected to an accumular 102. This accumulator is connected to the line 49 to maintain pressure at all times in the chamber 47. The line 76 is connected to a reservoir or sump 103 from which fluid is supplied through a line 104 to the intake side of the pump 100.

*Operation*

The parts normally occupy the positions shown in Figure 2, the valve 62 being closed and the valve 73 open. Inasmuch as the valve 62 is pressure balanced because of the equal diameter of the opening 46 and the axial extension 63, there is no pressure tendency for the valve 62 to move in either direction and it accordingly remains on its seat through the force of the light biasing spring 65. Attention also is invited to the fact that the interior diameter of the tubular member 58 is approximately equal to the diameter of the bore 64, and since these spaces communicate with each other around the bolt 66, the entire valve assembly referred to is pressure balanced. Low pressure will exist in the motor chamber 23 since this chamber communicates with the chamber 45 and with the line 76 through the tubular member 58, around the valve 73 and through the chamber 70. Accordingly, the piston 21 will be held in its normal position by the return spring 24.

When the brakes are to be operated, the pedal 14 will be depressed to move the push rod 15 toward the left from the position shown in Figure 2. The usual return spring (not shown) in the master cylinder opposes movement of the lower ends of the lever arms 94 when the push rod 15 is operated, hence the pivot pin 93 will move to the left while the lever arms fulcrum at their lower ends. This effects counterclockwise turning movement of the lever 90, whereupon the point 91 on such lever will effect movement of the stem 80 to close the valve 73, the parts thus being moved to the lap valve position shown in Figure 3. Under such conditions, the line 76 and chamber 70 will be disconnected from the interior of the tubular member 58, hence the motor chamber 23 will be blocked against exhaust.

Further movement of the pedal 14 in the manner described will effect further movement of the stem 80 and ball 73, and engagement of this ball with its seat 72 will effect axial movement of the tubular member 58 to the right to the position shown in Figure 4. With the motor chamber 23 closed to exhaust in the manner stated, and with the valve 62 opened as in Figure 4, fluid under pressure from the accumulator will flow through the valve opening 46 into chamber 45, thence through passage 77 into the motor chamber 23 to effect movement of the piston 21 to the left, for example to the position shown in Figure 4. Since force is being applied to the push rod 15, the lower ends of the lever arms 94 will follow the collar 29 to the left. This provides a perfect follow-up action of the valving since obviously any tendency of the contact points 95 to override a given position of the valves, when motion of the pedal is arrested, will result in movement of the pivot point 93 to the right to release pressure between the contact point 91 and the stem 80. If the brakes are moderately applied, therefore, and movement of the pedal is arrested, the valve elements will promptly return to the lap position shown in Figure 3.

It will be apparent that force will be applied through the pivot point 96 to the lever arms 94 to assist the motor piston 21 in transmitting force to the master cylinder piston. Thus predetermined portions of the work of applying the brakes will be performed by the motor piston 21 and by the pressure exerted by the operator on the pedal 14.

During initial operation of the mechanism, for example up to the point illustrated in Figure 4, it will be apparent that pressures supplied to the motor chamber 23 will act against the area of the ball 73 within the valve seat 72, thus providing against the head 81 and the elements connected thereto a predetermined hydraulic reaction which will be transmitted to the pedal. When pressures generated in the master cylinder reach a predetermined point, for example from 50 to 70 p.s.i., resistance to movement of the rod 28 will oppose movement of the lower ends of the lever arms 94 toward the left. At the same time, there will be increased opposition to movement of the piston 21 and pressures in the chamber 23 will increase. This increase in pressure likewise will take place in the chamber 45, and at the desired predetermined pressure in the master cylinder, as reflected by increased hydraulic pressures in the motor and in the chamber 45, the spring 54 will be overcome and the bearing washer 52 will be moved to the left of the position shown in Figure 4 to bring it into engagement with the cylindrical member 82. At this point, a substantially increased hydraulic reaction will be transmitted to the brake pedal. Whereas in earlier stages of brake operation, the hydraulic reaction will be that represented by the area of the ball 73 exposed to the interior of the tube 58, which will be determined by the diameter of the valve seat 72, the entire area of the seal 53 will now be exposed to the higher pressure. The engagement of the bearing washer 52 against the member 82 thus substantially increasingly opposes manual operation of the valve stem 81 to provide higher hydraulic reactions in later stages of brake operation.

As increasing pedal pressure is then exerted, the body of the tubular member 58 will move closer to the wall in which the opening 46 is formed, and contact between these elements will take place approximately at the point at which the hydraulic motor is energized to the maximum extent. No further movement of the stem 80 to the right can take place, and beyond the point of power "run out," that is, the point of maximum motor energization, increased pedal pressure can be exerted to increase the forces transmitted to the master cylinder piston.

As previously stated, the push rod 28 is slidable in the bore 27, and such push rod accordingly is freely movable to the left independently of the motor piston 21. In the event of a failure of power in the source of hydraulic pressure, therefore, operation of the pedal 14 will promptly effect movement of the valve parts to the limit of movement thereof, after which pedal forces will be transmitted through pin 96 to the lever arms 94 to operate the rod 28 and thus effect a pedal actuation of the master cylinder piston. This operation takes place with the piston 21 remaining in its normal position shown in Figures 2 and 3 while the rod 28 moves to the left. Under such conditions, therefore, the operator is not called upon to expend a part of the foot-applied forces against the pedal to overcome the loading of the spring 24 or the friction of the piston 21 in its cylinder. There accordingly will be a greater utilization of foot-applied pressures for operating the master cylinder piston 31.

The use of a valve mechanism offset laterally from the motor piston minimizes the axial length of the apparatus, as is desirable, and it permits the use of the lever mechanism for applying forces to the rod 28 independently of the motor piston 21, thus permitting the operation of the push rod 28 independently of the motor piston 21 upon a failure of power in the motor.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A power mechanism comprising a motor having a piston therein and having a pressure chamber, a rod having connection with said piston to be movable thereby, a valve mechanism connected between said pressure chamber and a source of pressure and normally occupying a position disconnecting said chamber from said source, a manually operable element, said valve mechanism being laterally offset from said motor and having valve elements movable parallel to the axis of said motor, a first lever pivotally connected intermediate its ends to said manually operable element and having one end mechanically engaging said rod, a second lever pivotally supported intermediate its ends on a pivot axis and having one end pivotally connected to the other end of said first lever, the other end of said second lever engaging said valve mechanism whereby, upon operation of said manually operable element, said first-named end of said first lever will transmit a force to said rod and the other end of said first lever will swing said second lever about its pivot to operate said valve mechanism and connect said pressure chamber to said source, reaction means exposed to and movable by the pressure of fluid supplied to said pressure chamber when said valve mechanism is operated, means opposing movement of said reaction means until pressure in said pressure chamber increases to a predetermined point, and means for transmitting pressure from said reaction means to said second lever to oppose turning movement thereof on its pivot axis.

2. A power mechanism comprising a motor having a piston therein and having a pressure chamber, a rod having connection with said piston to be movable thereby, a valve mechanism connected between said pressure chamber and a source of pressure and normally occupying a position disconnecting said chamber from said source, a manually operable element, said valve mechanism being laterally offset from said motor and having valve elements movable parallel to the axis of said motor, a first lever pivotally connected intermediate its ends to said manually operable element and having one end mechanically engaging said rod, a second lever pivotally supported intermediate its ends on a pivot axis and having one end pivotally connected to the other end of said first lever, the other end of said second lever engaging said valve mechanism whereby, upon operation of said manually operable element, said first-named end of said first lever will transmit a force to said rod and the other end of said first lever will swing said second lever about its pivot to operate said valve mechanism and connect said chamber to said source, means exposed to the pressure of fluid supplied to said chamber when said valve mechanism is operated, means for transmitting pressure from said last-named means to said second lever to oppose turning movement thereof on its pivot axis, a pressure responsive element exposed to pressure supplied to said chamber when said valve mechanism is operative, and means biasing said pressure responsive element to a normal inoperative position, said valve mechanism having a portion mechanically connected to said second lever and arranged in the path of travel of said pressure responsive element whereby, when pressure supplied to said chamber increases to a predetermined point, said biasing means will be overcome and said pressure responsive element will act through said portion of said valve mechanism to oppose valve operating movement of said second lever.

3. A power mechanism comprising a motor having a piston therein, a push rod engaging at one end against said piston, said motor having a pressure chamber, a valve mechanism connected between said chamber and a source of pressure and operable for connecting said chamber to said source, a manually operable element, a first lever pivotally connected to said manually operable element and having one end engaging said push rod, a second lever, means supporting said second lever for turning movement on a fixed axis, said first lever being pivotally connected to said second lever and said second lever engaging said valve mechanism whereby, upon operation of said manually operable element, said first lever will transmit forces to said push rod and will turn said second lever to operate said valve mechanism to connect said chamber to said source, said valve mechanism comprising a control chamber communicating with said pressure chamber and further comprising a normally closed valve between said control chamber and said source, a member connected to be operated by said second lever and exposed to pressure in said control chamber whereby, when said valve is opened to connect said control chamber to said source, said member will be exposed to pressure in said control chamber to oppose valve operating movement of said second lever, a pressure responsive element exposed to pressure in said control chamber, and means engaging said pressure responsive element to bias it to a normally inoperative position, said valve mechanism comprising an element connected for operation by said second lever and normally spaced from said pressure responsive element and engageable by the latter when pressure in said control chamber increases to a predetermined point and overcomes said biasing means, to oppose movement of said second lever.

4. A power mechanism comprising a motor having a piston therein, a push rod engaging at one end against said piston, said motor having a pressure chamber, a valve mechanism laterally offset from said motor, said valve mechanism comprising a control chamber connected to said motor chamber, an inlet chamber communicating with a source of pressure, a valve seat between said control and inlet chambers, a valve in said inlet chamber normally engaging said seat, a low pressure chamber normally at atmospheric pressure, a movable conduit member between said control chamber and said low pressure chamber connected to said valve, said conduit member communicating with said control chamber, operating means extending externally of said valve mechanism and having portions arranged in said low pressure chamber, a normally open exhaust valve engaged by said operating means and movable thereby to close communication between the interior of said conduit member and said low pressure chamber and to transmit forces through said conduit member to said first-named valve to open the latter, a manually operable element, a lever mechanism connected between said manually operable element and said push rod and said operating means whereby operation of said manually operable element will transmit a force to said push rod and will actuate said operating means to close said exhaust valve and open said first-named valve to supply pressure to said pressure chamber, a pressure responsive element dividing said control chamber from said low pressure chamber, and a spring in said low pressure chamber biasing said pressure responsive element to a normal inoperative position, the portion of said operating means in said low pressure chamber having an end normally spaced from said pressure responsive element and engageable by the latter when pressure in said control chamber overcomes the loading of said spring to engage said end of said portion of said valve operating means to oppose operation of said lever mechanism.

References Cited in the file of this patent

UNITED STATES PATENTS

| 1,468,602 | Loughead | Sept. 18, 1923 |
| 1,997,062 | Huffman | Apr. 9, 1935 |
| 2,130,799 | Hofstetter | Sept. 20, 1938 |
| 2,229,247 | Kamenarovic | Jan. 21, 1941 |
| 2,241,374 | Alfieri | May 13, 1941 |
| 2,382,866 | Edge et al. | Aug. 14, 1945 |
| 2,472,695 | Chouings | June 7, 1949 |
| 2,766,732 | Schultz | Oct. 16, 1956 |
| 2,775,957 | Anderson | Jan. 1, 1957 |